(12) United States Patent
Oguri

(10) Patent No.: US 6,580,898 B1
(45) Date of Patent: Jun. 17, 2003

(54) SUPERVISORY SYSTEM AND METHOD

(76) Inventor: Toshitaka Oguri, 1-20-1-301, Yoshikura-cho, Yokosuka-shi, Kanagawa 238-0047 (JP)

(*) Notice: Subject to any disclaimer, the term of this patent is extended or adjusted under 35 U.S.C. 154(b) by 0 days.

(21) Appl. No.: 09/563,838

(22) Filed: May 4, 2000

(30) Foreign Application Priority Data

May 17, 1999 (JP) ........................................ H11-135391

(51) Int. Cl.⁷ ................................................ H04B 7/14
(52) U.S. Cl. .................. 455/8; 455/8; 455/9; 455/423; 455/424; 455/425; 714/2; 714/6; 714/48
(58) Field of Search ................. 455/8, 9, 423, 455/424, 425; 714/1–48

(56) References Cited

U.S. PATENT DOCUMENTS

| | | | |
|---|---|---|---|
| 4,933,672 A | * 6/1990 | Blanc et al. | 340/825.2 |
| 5,274,645 A | * 12/1993 | Idleman et al. | 714/6 |
| 5,485,576 A | * 1/1996 | Fee et al. | 370/228 |
| 5,517,616 A | * 5/1996 | Taylor | 714/11 |
| 5,661,719 A | * 8/1997 | Townsend et al. | 370/216 |
| 5,774,640 A | * 6/1998 | Kurio | 714/4 |
| 5,966,510 A | * 10/1999 | Carbonneau et al. | 710/18 |
| 5,974,114 A | * 10/1999 | Blum et al. | 370/217 |
| 6,035,415 A | * 3/2000 | Fleming | 714/11 |
| 6,105,146 A | * 8/2000 | Tavallaei et al. | 714/1 |
| 6,173,411 B1 | * 1/2001 | Hirst et al. | 709/223 |

FOREIGN PATENT DOCUMENTS

| | | |
|---|---|---|
| EP | 0632381 | 4/1995 |
| JP | 6097864 | 4/1994 |
| JP | 2845049 | 10/1998 |

OTHER PUBLICATIONS

European Search Report dated Dec. 12, 2000.
Patent Abstracts of Japan vol. 017, No. 386 (E–1401), Jul. 20, 1993, & JP 05 067992 A (NEC Corp; Others; 01), Mar. 19, 1993.
Patent Abstracts of Japan vol. 018, No. 546 (P–1814), Oct. 18, 1994 & JP 06 195318 A (Kanebo Ltd), Jul. 15, 1994.

* cited by examiner

Primary Examiner—Daniel Hunter
Assistant Examiner—Stephen D'Agosta

(57) ABSTRACT

First and second supervised cards 103 and 104 are respectively provided with bus registers 114 and 115, CPUs 116 and 117 detect occurrence of a state change or failure of the respective apparatuses, the detected state change or failure information is stored in bus registers 114 and 115, and CPU 110 of currently used supervising card 101, alternately set to be used or reserved, reads the stored state change or failure information through supervisory control bus 105, and thereby supervises first and second supervised cards 103 and 104.

9 Claims, 2 Drawing Sheets

SUPERVISORY SYSTEM AND METHOD

BACKGROUND OF THE INVENTION

1. Field of the Invention

The present invention relates to a supervisory system and method, provided in, for example, a base station (BS or BTS) apparatus in a mobile communication system, for supervising occurrence of a state change and failure of supervised sections performing various processing in the apparatus.

2. Description of the Related Art

An example of this kind of conventional supervising system and method is described in Japanese Patent Publication No. 2845049.

As a supervising system, for example, in the case of supervising a state and failure of a card (hereinafter referred to as supervised card) with various processing functions for a radio base station, there is provided a system in which another card (hereinafter referred to as supervising card) that supervises the supervised cards to control is connected to each supervised card through a bus, and when a state change or failure occurs in each supervised card, the corresponding supervised card spontaneously transmits a message indicative of the state information to the supervising card through the bus.

In another method, the supervising card transmits a request message to collect state information to the supervised card, and the supervised card returns a confirmation message with the state and failure information attached thereto to the supervising card.

Also in the case where supervising cards are comprised of the same two cards alternately set to be currently used and reserved, the supervised card can return the confirmation message to the supervising card, which transmits the request message. However when the supervised card transmits a notice message spontaneously to the supervising card, it is necessary for the supervised card to always recognize which supervising card is currently used to transmit the notice message thereto. Therefore whenever the currently used supervising card and reserved supervising card are switched, a newly used supervising card is notified to all the supervised cards.

However in the conventional apparatus, for example, as a radio base station apparatus, functions and capabilities required for such an apparatus are increased, and the number of cards is also increased that adopt such a redundant construction that the cards are separately set to be currently used and reserved alternately to improve the reliability. As a result, types of cards in the base station apparatus tend to be increased, and the number of total cards in a third generation radio base station reaches almost 100.

Since the supervision notice processing of each card is achieved by software, the conventional method in which transmission and reception of messages is performed synchronously between the supervising card and a plurality of supervised cards provides a high load on a CPU that controls the supervising card.

For example, since the CPU of the supervising card executes processing other than the supervision, when the message indicative of the state change or failure is transmitted from the supervised card during the processing, the CPU should suspend the current processing by interruption processing to execute the supervision processing, thereby providing the high load on the CPU.

Further it is necessary in each supervised card to suppress a resource assigned to the supervision function as much as possible to increase resources assigned to processing originally assigned for the card. However since the supervised cards should negotiate with the supervising card as described above, there is the problem that a ratio of the resource assigned to the supervision function to the entire resource in each supervised card is increased.

SUMMARY OF THE INVENTION

An object of the present invention is to provide a supervisory system and method capable of reducing a load on a CPU provided in each card when a supervising card supervises a plurality of supervised cards executing various processing provided in, for example, a base station, and further capable of executing the supervisory control with the load on the CPU reduced even if the number of supervised cards is increased with the expansion of the system.

The object is achieved by a supervisory system in which each of a plurality of supervised devices is provided with a memory, detects occurrence of a state change or failure of the own device, and stores information on the detected state change or failure in the memory, and a current supervising device in the construction that the supervising device is alternately set to be currently used or reserved reads the stored state change or failure information through a bus to supervise the plurality of supervised devices.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

An embodiment of the present invention will be described below with reference to a drawing.

Figure 1:
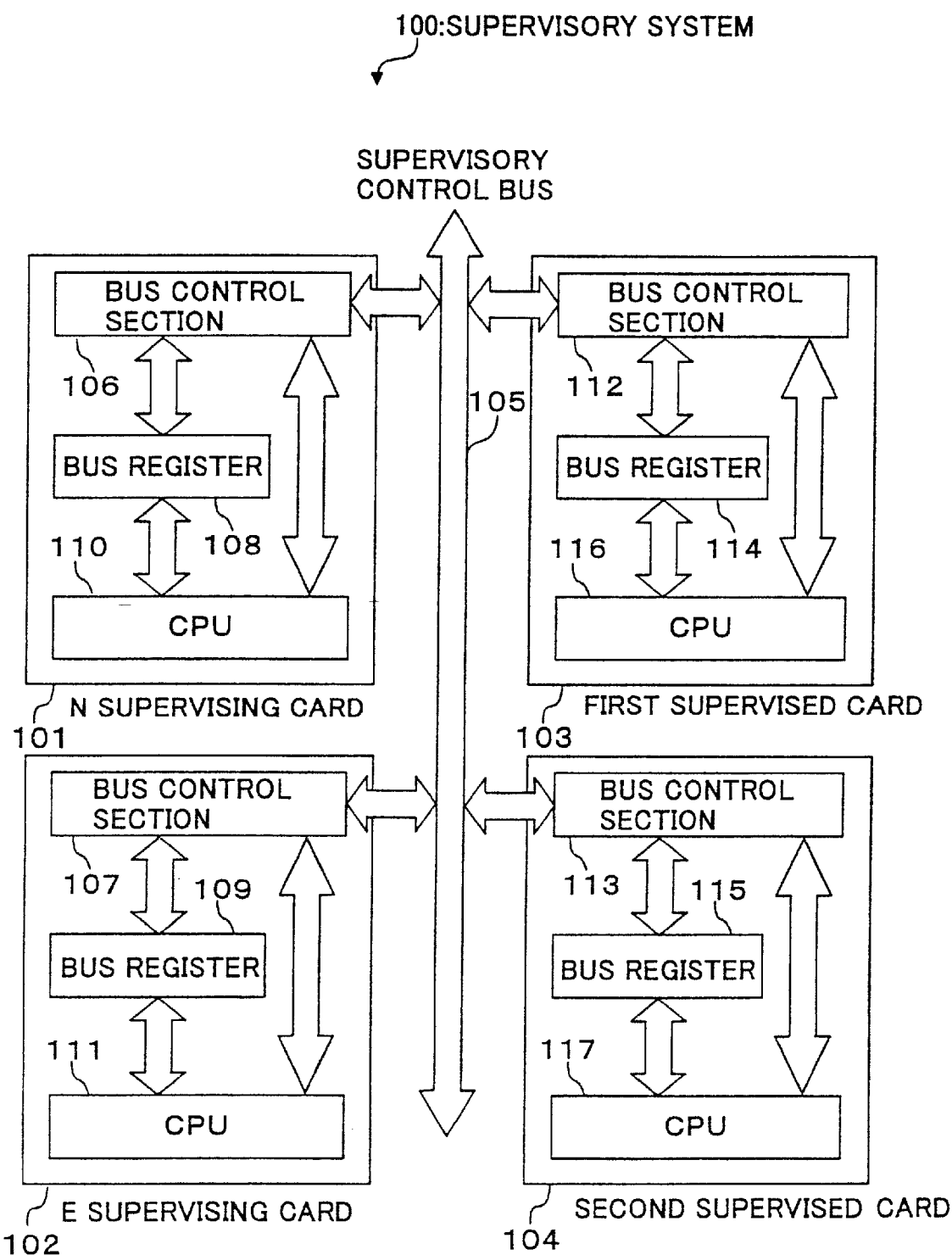
FIG. 1 is a block diagram illustrating a constitution of a supervisory system according to one embodiment of the present invention.

FIG. 1 is a block diagram illustrating a constitution of a supervisory system according to one embodiment of the present invention. In addition, supervisory system 100 illustrated in FIG.1 is provided in a base station apparatus in a mobile communication system, and supervises occurrence of a state change or failure of supervised cards performing various processing in the base station apparatus.

Supervisory system 100 illustrated in FIG. 1 is comprised of N supervising card 101 and E supervising card 102 either of which is currently used and the other of which is reserved, first and second supervised cards 103 and 104 of which the occurrence of the state change and failure is supervised by supervising cards 101 or 102, and supervisory control bus 105 that mutually connects all the cards, i.e., supervising cards 101 and 102 and supervised cards 103 and 104.

In addition, the number of supervising cards is 2 in this case, but such a number is not limited particularly as long as the cards are under the connection capability of supervisory control bus 105.

N and E supervising cards 101 and 102 with the same configuration are provided with processing functions required for operating the base station apparatus besides the supervisory processing. N and E supervising cards 101 and 102 are respectively comprised of bus control sections 106 and 107 that control supervisory control bus 105, bus registers 108 and 109 to store state change and failure information of the own card while being used as a reserve, and CPUs 110 and 111 that execute the supervisory processing and the processing required for operating the base station apparatus.

First and second supervised cards 103 and 104 are provided with the processing functions required for operating the base station apparatus besides the supervision processing, and are respectively comprised of bus control sections 112 and 113 that control supervisory control bus 105, bus registers 114 and 115 to store state change and failure information of the own card, and CPUs 116 and 117 that execute the supervision processing and the processing required for operating the base station apparatus.

Figure 2:
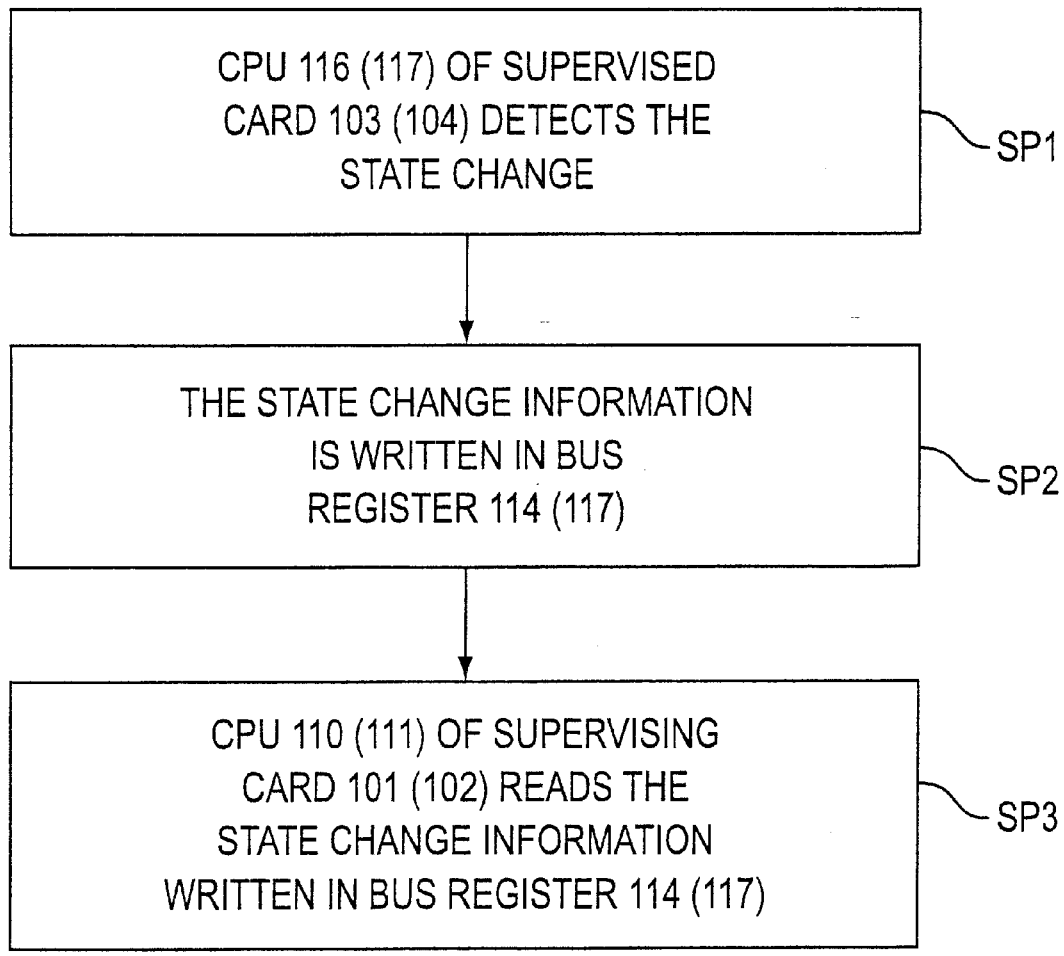
FIG. 2 is a flowchart illustrating the operation performed when a state of a supervised card changes, according to the present invention.

A description explaining the operation performed when a state of the supervised card changes in supervisory system 100, with the above constitution, is given below with reference to FIG. 2. In addition, it is assumed that N supervising card 100 is currently used and E supervising card 102 is reserved.

When a state of first supervised card 103 changes, CPU 116 detects the state change (SP1) according to software, which allows the card to perform the supervision processing (hereinafter referred to as supervision software), and writes the state change information in a predetermined memory area in bus register 114 (SP2).

CPU 110 of N supervising card 101 supervises the states of first and second supervised cards 103 and 104 at a period required for the supervision and according to software allowing the card to perform the supervisory processing (hereinafter referred to as supervisory software). When a supervisory timing for first supervised card 103 comes, CPU 110 of N supervising card 101 controls bus control section 106 to read a value of the state change information written in bus register 114 (SP3), through supervisory control bus 105, without regard for the operation being performed by CPU 116 of first supervised card 103. In other words, N supervising card 101 collects the state change information to supervise without synchronizing this collection operation with CPU 116 of first supervised card 103 and without informing CPU 116 of this collection operation.

N supervising card 101 collects the state change information of second supervised card 104 to supervise in the same way as for the first supervised card 103.

Further it is necessary to supervise a state change of E supervising card 102 currently being reserved. Therefore when a state of E supervising card 102 changes, in the card 102 in the same way as in the supervised card 103, CPU 111 detects the state change according to the supervision software, and writes the state change information in the predetermined storage area in bus register 109.

CPU 110 of N supervising card 101 supervises the state of E supervising card 102 at a period required for the supervision according to the supervisory software, and when a supervisory timing for E supervising card 102 comes, controls bus control section 106 to read a value of the state change information written in bus register 109 through supervisory control bus 105 regardless of CPU 111 of E supervising card 102.

Since first and second supervised cards 103 and 104 have the same function of operating to be supervised, the supervision as described above is made possible also when currently reserved E supervising card 102 starts operating to be used. Further since supervising cards 101 and 102 also have the same configuration, it is possible for a currently supervising card to supervise a reserved one when either one is used or reserved as described above.

In addition, it may be possible that a CPU of a card operates when another card accesses the bus register of the card in order to reduce the cost of bus control sections 106, 107, 112 and 113 built in respective cards 101 to 104.

Further, this embodiment explains that bus control sections 106, 107, 112 and 113 built in respective cards 101 to 104 have the same configuration, however it may be possible to set supervising cards 101 and 102 to be bus masters, and set the other cards to be slaves.

The operation performed when a failure occurs on a supervised card is next explained. In addition, it is assumed that N supervising card 101 is currently used, and E supervising card 102 is reserved.

When a failure occurs on first supervised card 103, CPU 116 detects the failure occurrence according to the supervision software, and writes the failure information in a predetermined memory area in bus register 114.

CPU 110 of N supervising card 101 supervises states of first and second supervised cards 103 and 104 at a period required for the supervision according to the supervisory software. When a supervisory timing for first supervised card 103 comes, CPU 110 of N supervising card 101 controls bus control section 106 to read a value of the failure information written in bus register 114 through supervisory control bus 105 regardless of CPU 116 of first supervised card 103. In other words, N supervising card 101 collects the failure occurrence information to supervise without being synchronized with first supervised card 103.

N supervising card 101 collects the failure information of second supervised card 104 to supervise in the same way as for first supervised card 103.

Further it is necessary to supervise a failure occurrence of E supervising card 102 currently being reserved. Therefore when a failure occurs on E supervising card 102, in the card 102 in the same way as in the supervised card 103, CPU 111 detects the failure occurrence according the supervision software, and writes the failure information in the predetermined storage area in bus register 109.

CPU 110 of N supervising card 101 supervises the state of E supervising control card 102 at a period required for the supervision according to the supervisory software, and when a supervisory timing for E supervising card 102 comes, CPU 110 of N supervising card 101 controls bus control section 106 to read a value of the failure information written in bus register 109 through supervisory control bus 105 regardless of CPU 111 of E supervising card 102.

Since first and second supervised cards 103 and 104 have the same function of operating to be supervised, the supervision as described above is made possible also when currently reserved E supervising card 102 starts operating to be used. Further since supervising cards 101 and 102 also have the same configuration, it is possible for a currently supervising card to supervise a reserved one when either one is used or reserved as described above.

In addition, as the value of the failure information, a bit is assigned to a type of failure in advance, and, for example, it is determined that the corresponding bit of "1" represents the failure occurrence. Examples of typical types of failures are watch dog time out, memory failure, clock failure, and bus failure.

The following description explains the operation to directly notify the supervising card of a state change or failure with particular contents of the supervised card. In addition, it is assumed that N supervising card 101 is currently used, and E supervising card 102 is reserved.

When it is necessary for first supervised card 103 to notify currently used N supervising card 101 of a state change or failure thereof, since CPU 116 of first supervising card 103 does not recognize which of supervising cards 101 and 102 is currently used, CPU 116 controls bus control section 112 to transmit the state change or failure information to both supervising cards 101 and 102.

Since CPU 110 of N supervising card 101 recognizes that the own card 101 is currently used, CPU 110 receives the notified state change or failure information, and executes the corresponding processing. On the other hand, since CPU 111 of E supervising card 102 recognizes that the own card 102 is currently reserved, CPU 111 discards the notified state change or failure information without receiving it.

In addition, it may be possible for the supervised card to notify the supervising card of the state change or failure information by using a simulcast function of supervisory control bus 105 or transmitting the notification separately. Further it may be possible for E supervising card 102 to discard the state change or failure information by using bus control section 107 or using software executed by CPU 111.

Furthermore it may be possible that when the supervised card notifies the supervising card of the state change or failure information, supervising cards 101 and 102 respectively being used and reserved both receive the state change or failure information to process, and thereafter only currently used supervising card 101 transmits the processed state change or failure information to a host apparatus with which a supervisor performs a supervisory job.

Thus, according to supervisory system 100 of this embodiment, first and second supervised cards 103 and 104 are respectively provided with bus registers 114 and 115, CPUs 116 and 117 detect occurrence of the state change or failure of the own apparatus, the detected state change or failure information is stored in respective bus registers 114 and 115, and CPU 110 of currently used supervising card 101, alternately set to be used or reserved, reads the stored state change or failure information through supervisory control bus 105, and thereby supervises first and second supervised cards 103 and 104.

Thus, since supervising card 101 can read the state change or failure information of first and second supervised cards 103 and 104 at an arbitrary timing of own CPU 110 to execute the supervisory processing, it is not necessary to acquire synchronization between the supervising card and a plurality of supervised cards unlike the conventional apparatus, thereby reducing the load on CPU 110.

Further since it is enough for first and second supervised cards 103 and 104 to detect the state change or failure of the own card to store, the negotiation with the supervising card that is conventionally performed is made no need. Supervised cards 103 and 104 thereby have a decreased ratio of the processing for the supervision to the entire assigned processing, and consequently can reduce loads on respective CPUs 116 and 117.

Moreover first and second supervising cards 101 and 102 being respectively used and reserved are respectively provided with bus registers 108 and 109, CPU 111 of currently reserved supervising card 102 detects occurrence of the state change or failure of the own apparatus, the detected state change or failure information is stored in bus registers 109, and currently used supervising card 101 reads the state change or failure information stored in bus register 109 through supervisory control bus 105, and thereby supervises reserved supervising card 102, whereby currently used supervising card 101 can supervise the occurrence of state change or failure of currently reserved supervising card 102.

Further first and second supervised cards 103 and 104 notify the state change or failure information detected by the CPU thereof through supervisory control bus 105 to supervising cards 101 and 102 respectively being used and reserved, and only supervising card 101 being currently used receives the notified state change or failure information. Therefore first and second supervised cards 103 and 104 can notify the state change or failure information without recognizing that either of the supervising cards is currently used. As a result, the negotiation between the supervising and supervised cards as performed conventionally is made no need, the ratio of the processing for the supervision assigned to CPUs 116 and 117 is decreased, and thereby it is possible to reduce loads on CPUs 116 and 117.

Furthermore first and second supervised cards 103 and 104 notify the state change or failure information detected by the CPU thereof through supervisory control bus 105 to supervising cards 101 and 102 respectively being used and reserved, and only supervising card 101 being currently used notifies the notified state change or failure information to an apparatus used for the supervision by a host personnel. Therefore first and second supervised cards 103 and 104 can notify the state change or failure information without recognizing that either of supervising cards is currently used. As a result, the negotiation between the supervising and supervised cards as performed conventionally is made no need, the ratio of processing for the supervision assigned to CPUs 116 and 117 is decreased, and thereby it is possible to reduce loads on CPUs 116 and 117.

A supervisory system of the present invention has a plurality of supervised apparatuses each of which is provided with a first memory section, detects occurrence of a state change or failure of each apparatus, and stores information on a detected state change or failure in the first memory means, and supervising apparatuses, separately set to be currently used and reserved alternately, which are connected to the plurality of supervised apparatuses through a bus, and a currently used supervising apparatus reads the information stored in the first memory section through the bus to supervise the supervised apparatuses.

According to this constitution, since the supervising apparatus can read the state change or failure information of a plurality of supervised apparatuses at an arbitrary timing of the own apparatus to execute the supervisory processing, the supervising apparatus does not need to synchronize itself with the plurality of supervised apparatuses to supervise unlike the conventional apparatuses, and thereby can reduce a processing load thereon. Further since it is enough for each of the plurality of supervising apparatuses to detect the state change or failure in each apparatus to store, the negotiation with the supervising apparatus as conventionally performed is made no need. The supervised apparatuses thereby have a decreased ratio of the processing for the supervision to the entire assigned processing, and consequently can reduce respective processing loads thereon.

In the supervisory system of the present invention, the supervising apparatuses each is provided with a second memory section, a reserved supervising apparatus detects a state change or failure of the apparatus, and stores information on a detected state change or failure in the second memory section, and the currently used supervising apparatus reads the information stored in the second memory section through the bus to supervise the reserved supervising apparatus.

According to this constitution, it is possible for the currently used supervising apparatus to supervise the occurrence of the state change or failure of the reserved supervising apparatus.

In the supervisory system of the present invention, each of the supervised apparatuses notifies the information on the detected state change or failure to the supervising apparatuses through the bus, and only the currently used supervising apparatus receives notified information on the detected state change or failure.

According to this constitution, supervised apparatuses can notify the state change or failure information without recognizing that either of the supervising apparatuses is currently used. As a result, the negotiation with the supervising apparatus as performed conventionally is made no need, the ratio of the processing for the supervision assigned to the supervised apparatuses is decreased, and thereby it is possible to reduce loads on the supervised apparatuses.

In the supervisory system of the present invention, each of the supervised apparatuses notifies the information on the detected state change or failure to the supervising apparatuses through the bus, and only the currently used supervising apparatus notifies notified information on the detected state change or failure to a host apparatus.

According to this constitution, supervised apparatuses can notify the state change or failure information without recognizing that either of the supervising apparatuses is currently used. As a result, the negotiation with the supervising apparatus as performed conventionally is made no need, the ratio of processing for the supervision assigned to the supervised apparatuses is decreased, and thereby it is possible to reduce loads on the supervised apparatuses.

In a supervisory method of the present invention, each of a plurality of supervised apparatuses detects a state of each apparatus, and stores information on a detected state, a currently used supervising apparatus that is one of supervising apparatuses reads stored information on the detected state to supervise the supervised apparatuses, and the supervising apparatuses are separately set to be currently used and reserved alternately.

According to this method, since the supervising apparatus can read the state change or failure information of the plurality of supervised apparatuses at an arbitrary timing of the own apparatus to execute the supervisory processing, the supervising apparatus does not need to synchronize itself with the plurality of supervised apparatuses to supervise unlike the conventional apparatuses, and thereby can reduce a processing load thereon. Further since it is enough for each of the plurality of supervising apparatuses to detect the state change or failure in each apparatus to store, the negotiation with the supervising apparatus as conventionally performed is made no need. The supervised apparatuses thereby have a decreased ratio of the processing for the supervision to the entire assigned processing, and consequently can reduce respective processing loads thereon.

In the supervisory method of the present invention, a reserved supervising apparatus detects a state of the apparatus, and stores information on a detected state, and the currently used supervising apparatus reads stored information on the detected state to supervise the reserved supervising apparatus.

In the supervisory method of the present invention, each of the supervised apparatuses notifies the information on the detected state to the supervising apparatuses, and only the currently used supervising apparatus receives notified information on the detected state.

According to this method, supervised apparatuses can notify the state change or failure information without recognizing that either of the supervising apparatuses is currently used. As a result, the negotiation with the supervising apparatus as performed conventionally is made no need, the ratio of processing for the supervision assigned to the supervised apparatuses is decreased, and thereby it is possible to reduce loads on the supervised apparatuses.

In the supervisory method of the present invention, each of the supervised apparatuses notifies the information on the detected state to the supervising apparatuses, and only the currently used supervising apparatus notifies notified information on the detected state to a host apparatus.

According to this constitution, supervised apparatuses can notify the state change or failure information without recognizing that either of the supervising apparatuses is currently used. As a result, the negotiation with the supervising apparatus as performed conventionally is made no need, the ratio of processing for the supervision assigned to the supervised apparatuses is decreased, and thereby it is possible to reduce loads on the supervised apparatuses.

The present invention is applicable to a base station apparatus in a mobile communication system. Thereby it is possible to obtain the same effects as described above in the base station apparatus in the mobile communication system.

As described above, according to the present invention, in the case where a supervising card supervises a plurality of supervised cards executing various processing provided in, for example, a base station, it is possible to reduce a load on a CPU provided in each card, and further to execute the supervisory control with the load on the CPU reduced even if the number of supervised cards is increased with the expansion of the system.

The present invention is not limited to the above described embodiments, and various variations and modifications may be possible without departing from the scope of the present invention.

This application is based on the Japanese Patent Application No. HEI11-135391 filed on May 17, 1999, entire content of which is expressly incorporated by reference herein.

What is claimed is:

1. A supervisory system comprising:
a plurality of supervised apparatuses, each comprising a first bus register and a CPU that detects an occurrence of a state change or failure of the corresponding supervised apparatus; and
supervising apparatuses connected to said plurality of supervised apparatuses through a bus, said plurality of supervising apparatuses (i) each being separately and alternately set to a currently used supervising apparatus or a reserved supervising apparatus and (ii) supervising said supervised apparatuses based on detected state changes or failures of the supervised apparatuses, wherein:
each said CPU stores information on the detected state change or failure in said first bus register of the corresponding supervised apparatus, and
said supervising apparatuses read said information stored in said first bus register through said bus without synchronizing said read operation with said CPU of said respective supervised apparatus.

2. The supervisory system according to claim 1, wherein each of said supervising apparatuses further comprises a bus register, and wherein:

a reserved supervising apparatus detects a state change or failure of said reserved supervised apparatus and stores information on the detected state change or failure in said second bus register, and the currently used supervising apparatus reads said information stored in said second bus register through said bus to supervise said reserved supervising apparatus.

3. The supervisory system according to claim 1, wherein each of said supervised apparatuses provides said information on the detected state change or failure to said supervising apparatuses through said bus, and only the currently used supervising apparatus receives the information on the detected state change or failure.

4. The supervisory system according to claim 1, wherein each of said supervised apparatuses provides said information on the detected state change or failure to said supervising apparatuses through said bus, and only the currently used supervising apparatus provides said information on the detected state change or failure to a host apparatus.

5. A base station apparatus comprising a supervisory system, said system comprising:

a plurality of supervised apparatuses, each comprising a first bus register and a CPU that detects an occurrence of a state change or failure of the corresponding supervised apparatus; and supervising apparatuses connected to said plurality of supervised apparatuses through a bus, said supervising apparatuses (i) each being separately and alternately set to a currently used supervising apparatus or a reserved supervising apparatus and (ii) supervising said supervised apparatuses based on the detected state changes or failures of the supervised apparatuses, wherein:

each said CPU stores information on a detected state change or failure in said first bus register of the corresponding supervised apparatus, and said currently used supervising apparatus reads said information stored in said first bus register through said bus without synchronizing said read operation with said CPU of said respective supervised apparatus.

6. A supervisory method, comprising:

employing each of a plurality of supervised apparatuses to detect a state of a respective supervised apparatus and to store information on said detected state;

employing a currently used supervising apparatus that is one of a plurality of supervising apparatuses to read the stored information on said detected state through a bus without synchronizing said currently used supervising apparatus to a central processing unit of the respective supervised apparatus and to supervise said supervised apparatuses using the corresponding detected state information read from the respective supervised apparatus, said supervising apparatuses each being separately and alternately set to a currently used supervising apparatus and a reserved supervising apparatus.

7. The supervisory method according to claim 6, further comprising:

detecting a state of a reserved supervising apparatus with said reserved supervising apparatus;

storing information on the detected state within the reserved supervising apparatus;

reading the stored information from said reserved supervising apparatus with said currently used supervising apparatus; and supervising said reserved supervising apparatus with said currently used supervising apparatus using detected state information read from said reserved supervising apparatus.

8. The supervisory method according to claim 6, further comprising:

providing, from each of said supervised apparatuses, said corresponding information on the detected state to said supervising apparatuses; and receiving said corresponding information from each of said supervised apparatuses with only the currently used supervising apparatus.

9. The supervisory method according to claim 6, further comprising:

providing, from each of said supervised apparatuses, said corresponding information on the detected state to said supervising apparatuses; and providing, with said currently used supervising apparatus, said provided information to a host apparatus.

* * * * *